No. 795,773. PATENTED JULY 25, 1905.
E. A. JOHNSTON.
CORN HUSKER.
APPLICATION FILED FEB. 16, 1903.

2 SHEETS—SHEET 1.

Witnesses:
Chas. J. O'Neill
W. Beall Williams

Inventor:
E. A. Johnston
By his attys.
Rennie & Goldsborough

No. 795,773. PATENTED JULY 25, 1905.
E. A. JOHNSTON.
CORN HUSKER.
APPLICATION FILED FEB. 16, 1903.

2 SHEETS—SHEET 2.

Witnesses:
Chas. J. O'Neill
W. Beall Williams

Inventor:
E. A. Johnston,
By his attys.
Pennie & Goldsborough

UNITED STATES PATENT OFFICE.

EDWARD A. JOHNSTON, OF CHICAGO, ILLINOIS, ASSIGNOR TO INTERNATIONAL HARVESTER COMPANY, OF CHICAGO, ILLINOIS, A CORPORATION OF NEW JERSEY.

CORN-HUSKER.

No. 795,773.          Specification of Letters Patent.          Patented July 25, 1905.

Original application filed April 16, 1902, Serial No. 103,086. Divided and this application filed February 16, 1903. Serial No. 143,597.

*To all whom it may concern:*

Be it known that I, EDWARD A. JOHNSTON, a citizen of the United States, residing at Chicago, county of Cook, State of Illinois, have invented certain new and useful Improvements in Corn-Huskers; and I do hereby declare the following to be a full, clear, and exact description of the invention, such as will enable others skilled in the art to which it appertains to make and use the same.

The subject of the present application was originally illustrated, described, and claimed in my application for corn-harvesters, Serial No. 103,086, filed April 16, 1902; but as it relates only to that part of the machine of the former application which is concerned with the husking of the ears after they have been picked or snapped off the stalks I have divided it out of the original application and present it herewith dissociated from those parts of the machine that are more particularly concerned in the harvesting of the ears.

The present improvements comprise, first, a new construction of husking-rolls whereby the husking-pins may be simultaneously adjusted, so as to increase or diminish their aggressiveness, and, second, an arrangement of fingers for forwarding the ears along the rolls, so that should an obstruction be met that would be likely to break the fingers or any other part of the mechanism if made stiff or rigid the fingers themselves yield and pass over the obstruction, after which they either return to normal position automatically or are positively restored or forced back into such position just before they reach the discharge end of the rolls.

The invention will be best understood from the following description, taken in connection with the accompanying drawings, where—

Figure 1:
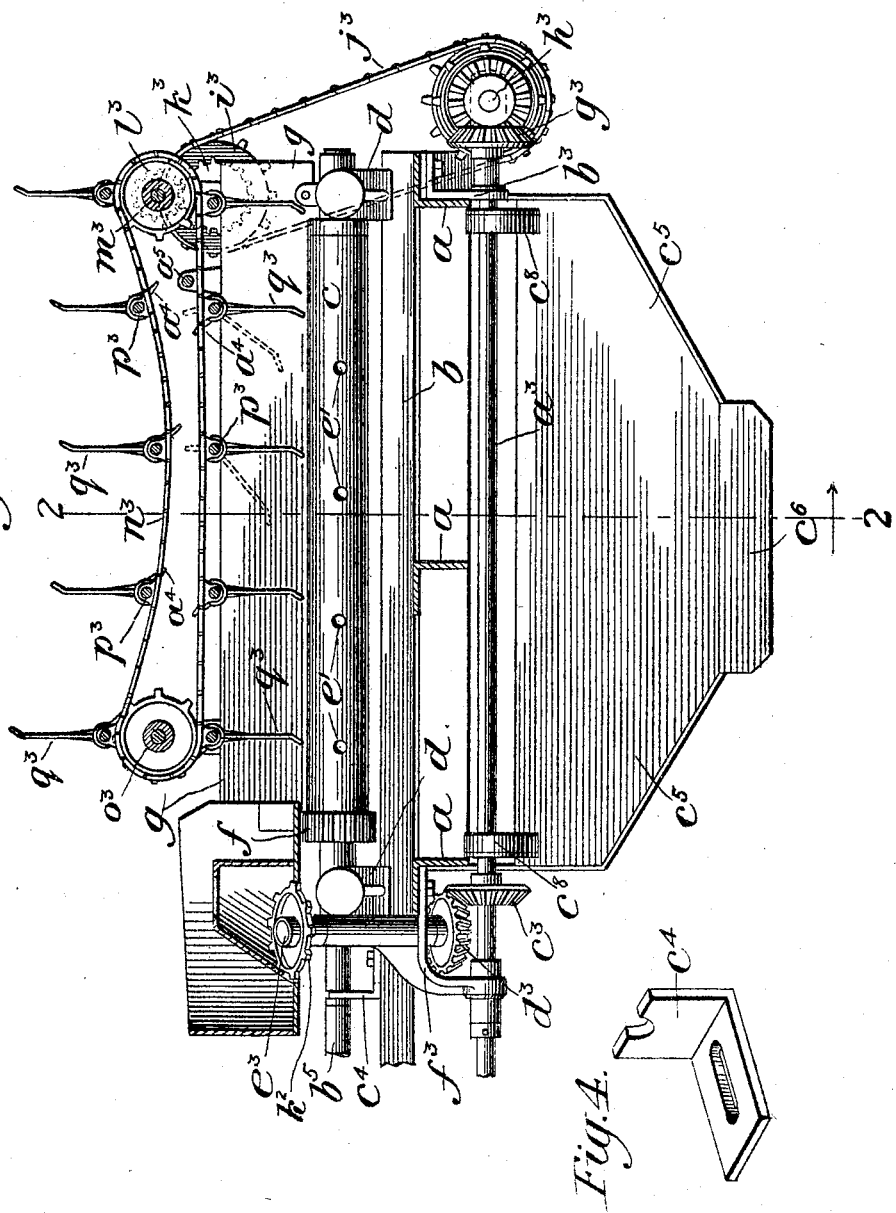
Figure 2:
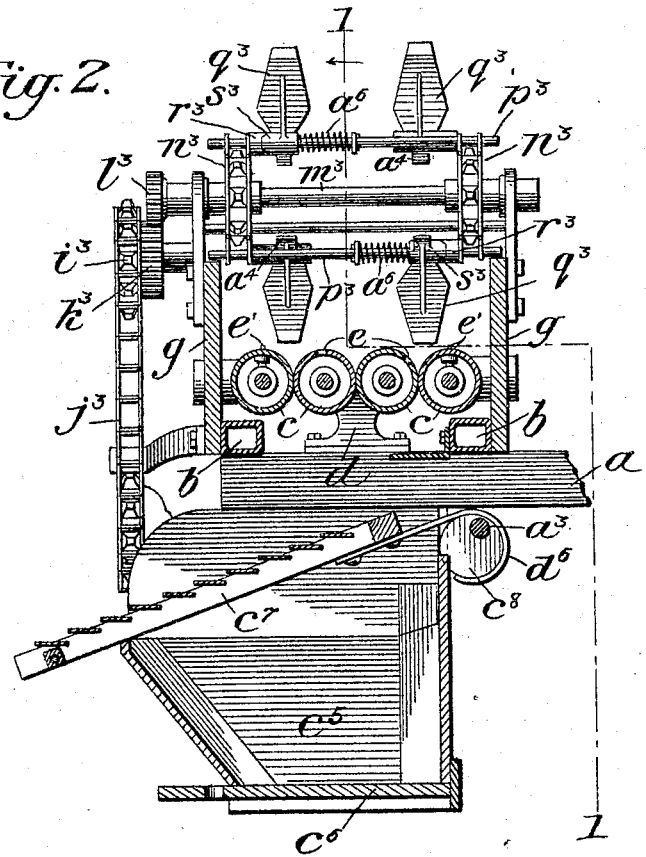
Figure 3:
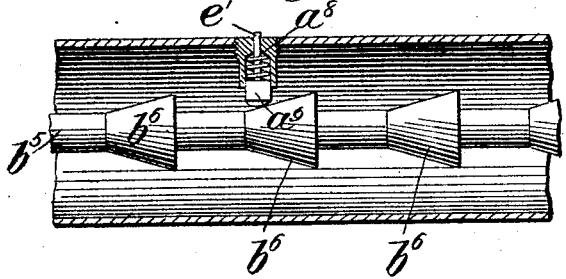

Figure 1 is a longitudinal section on the line 1 1, Fig. 2. Fig. 2 is a cross-section on the line 2 2, Fig. 1. Fig. 3 is a longitudinal section of a portion of one of the husking-rolls, and Fig. 4 is a perspective of the bracket for adjusting the cam-shaft in the husking-rolls.

Referring first to Figs. 1 and 2, $a$ $a$ denote continuations of certain fore-and-aft bars of the frame of the harvesting-machine, as may be better understood on referring to my application above referred to. The rear ends of these bars are connected together by cross-bars $b$ $b$, and these two sets of bars $a$ and $b$ form the supporting-framework for the husking attachment now to be described. The husking-rolls $c$, of which there are two pairs shown in the drawings, are journaled at opposite ends in boxes that are supported by brackets $d$, rising from the outer bars $a$ between the cross-bars $b$. The construction of these rolls will be described later on. For the present it is sufficient to explain that one roll of each pair is provided with recesses $e$ and that the other roll has a line of husking-pins $e'$ projecting from its surface in position to register with the recesses $e$ as the rolls revolve. Any number of pairs of these rolls may be employed, and they are intergeared by pinions at one end—as, for example, $f$ in Fig. 1—and are driven in any suitable way. At each side of the rolls and running along close to the outermost rolls side boards $g$ $g$ are arranged, being set edgewise and secured at their lower edges to the outer sides of the cross-bars $b$ $b$. These boards close in the husking-rolls, so as to form a long narrow husker-box that is open at both ends and of which the rolls form the bottom. Below the rolls and extending along underneath the cross-bar $b$ is line-shaft $a^3$, which is journaled in bearings and extends to and beyond the discharge ends of the husking-rolls, where it has a bearing $b^3$, depending from the side bar $a$ on the outer side. Near its driven end this shaft has a bevel-pinion $c^3$, which gears with a similar pinion $d^3$ on a short vertically-inclined shaft $e^3$, that is mounted in a yoke $f^3$, having a sleeve inclosing the shaft. The yoke is bolted to the fore-and-aft bar $a$ and also provides a bearing for the shaft $a^3$. The shaft $e^3$ carries at its upper end the driving-sprocket $k^2$, connected with parts of the harvesting-machine not necessary to describe herein. At the opposite end of the line-shaft $a^3$ there is a bevel-pinion $g^3$, which drives a short cross-shaft $h^3$, and from a driving-sprocket on this shaft a chain belt $j^3$ runs over a driven sprocket $i^3$ on a stud at the rear end of one of the side boards above the level of the husking-rolls. Rigid with the sprocket $i^3$ there is a spur-gear $k^3$, which meshes with a similar pinion $l^3$ on an overhead shaft $m^3$, which is mounted in bearings projecting above the side boards at the discharge end of the husker. The ear-discharger consists of a pair of endless chains $n^3$, traveling around the sprockets on this and another shaft $o^3$ over the opposite end of the husking-rolls. The chains $n^3$ $n^3$ are connected together by rods $p^3$, and these rods carry blades or paddles $q^3$, that travel constantly in one direction above the meeting-line of the husking-rolls, so as to sweep the ears off the rolls as they are husked. The blades are preferably arranged in alternate positions on adjacent rods $p^3$, as clearly shown in Fig. 2, and they are connected to the rods in the following manner, so as to yield when engaging ears that are held by their husks in the rolls: Each blade is mounted upon its rod by means of a hub having a cam-shaped end $s^3$, which engages with a collar $r^3$ on the rod, having a similar cam-shaped end. A spiral spring $a^6$ reacts against a pin in the rod and the opposite end of the hub of each paddle and holds the hub yieldingly against the collar $r^3$ with sufficient tension to prevent the paddles or blades from turning on the rod under the resistance opposed by the ears on the rolls. When, however, the blades encounter ears that are for the moment held by the grip which the rolls have on the husks, the spring yields and permits them to turn back on their rods into the position shown in dotted lines in Fig. 1. The blades are then free to pass over the ears; but as they must be restored to working position before they again come around the hubs have small projections $a^4$, projecting in almost an opposite direction to the blades, and a fixed rod $a^5$ is extended across the discharger near the delivery end in such position that the projections on the hubs will strike it just before the blades reach the end of the husking-rolls. This knocks the blades back into working position again, so that when they come around the next time they will hang vertically, as shown in Fig. 1.

The construction of the husking-rolls is best illustrated in Fig. 3. They are hollow metallic cylinders, and one of each pair is provided with a line of husking-pins $e'$ and the other with corresponding recesses $e$, running lengthwise. The pins are seated in hollow nipples $a^8$ and have springs reacting between the bottoms of the nipples and heads $a^9$ on their inner ends. The pins are adjustably mounted in the rolls—that is to say, they are adapted to be projected from the face of the roll to a greater or less extent, dependent upon the condition of the husks, or to compensate for wear—and the means for adjusting them consists of the shaft $b^5$, extending centrally through the rolls and having cone-shaped cams $b^6$, which when the shaft is moved in one direction forces the pins out and when moved in the other direction allows the springs to withdraw the pins. Each roll having pins is provided with one of these shafts, and they are made adjustable by being mounted at one end in brackets $c^4$, that are adjustably connected to one of the cross-bars $b$.

Beneath the husking-rolls a receptacle $c^5$ for shelled corn is provided. It consists of an ordinary box having a sliding bottom $c^6$ and hung from the frame-bars in any suitable way. An inclined screen $c^7$ is arranged over the top of this box and under the husking-rolls, as shown in Fig. 2. One end of the screen rests loosely on the rear edge of the box, and the other is connected by bent straps $d^6$ to eccentrics $c^8$ on the shaft $a^3$. This arrangement affords an effective means for shaking the screen, which latter forms a laterally-inclined chute for the husks.

The construction of the machine being in detail as thus described it is to be noted that the corn which is unavoidably shelled by the action of the husking-rolls is received into the receptacle beneath the screen, while the trash is carried off by the screen. The adjustment of the cam-carrying shaft in the interior of the husking-rolls effects the simultaneous projection or withdrawal of the husking-pins $e'$, so that these pins are easily adjusted so as to vary their aggressiveness as the condition of the crop may require. The rolls are shown herein as provided with but a single line of husking-pins. They may, however, be provided with any desired number of rows; but however this may be the gearing should be so arranged that the rows of pins on one roll will meet a corresponding row of holes on the adjacent roll as the rolls revolve together, thereby nipping the husks, stripping them from the ears, and carrying them down between the rolls and dropping them on top of the inclined screen, the ears being meanwhile swept lengthwise along the rolls and delivered into any suitable receptacle that may be arranged to receive them.

The manner of hanging the ear-carrying blades is particularly advantageous where the crop yields ears of unusual variation in size, as it is usual to adjust the aggressiveness of the husking-pins to the average condition of the ears, in consequence of which abnormal ears are sometimes caught by the pins and held so firmly that if the ordinary fixed blades were employed they would be broken.

The coöperating cam-surfaces between the hubs of the blades and the collars fixed on the rods may be shaped and inclined so that the blades will scarcely ever become set in their rearward position; but it is deemed best to have the tail-like projections on the hubs already described and to provide the cross-bar for positively restoring them to position.

Having thus described the invention, what I claim is—

1. The combination with coöperating husking-rolls, of ear-dischargers located above the rolls in normal position to engage the ears and push them along the rolls, said dischargers being constructed and adapted to be thrown out of operative position by unusual resistances offered by the ears.

2. The combination with coöperating husking-rolls, of endless chains traveling lengthwise above the rolls, ear-dischargers carried by said chains in normal position to engage and push the ears along the rolls, means permitting the dischargers to yield to unusual resistances offered by the ears, and means for engaging the dischargers and restoring them to operative position.

3. The combination with coöperating husking-rolls, of endless overhead chains $n^3$, $n^3$, cross-bars $p^3$ connecting the chains, ear-discharging blades $q^3$ sleeved on said rods, and yieldingly held in working position, a bar $a^5$, and heel projections $a^4$ on the blades in position to strike the bar.

4. The combination with coöperating husking-rolls, of endless overhead chains $n^3$, $n^3$, cross-bars $p^3$ connecting the chains, ear-discharging blades $q^3$ having cam-shaped hubs journaled on said rods, cam-shaped collars $r^3$ on the rods on one side of the blades, and springs $a^6$ yieldingly holding the hubs against the collars.

5. The combination to form a husking-roll, of a cylindrical shell, adjustable pins projecting from said shell, and means for simultaneously adjusting the pins.

6. The combination to form a husking-roll, of a cylindrical shell, having nipples $a^8$, pins $e'$ seated in said nipples, and a rod extending through the roll and having cams $b^6$ to adjust the degree of projection of the pins.

7. The combination of coöperating husking-rolls, a receptacle for shelled corn beneath the rolls, an ear-discharger overlying the rolls and operating to deliver the husked ears at one end, and a shaking screen-chute located under the rolls and laterally and downwardly inclined with respect to said rolls so as to discharge the husks at the side of the rolls.

8. The combination with coöperating husking-rolls, of continuously-traveling ear-dischargers located above the rolls in position to engage the ears and push them along the rolls, said dischargers being adapted, without stopping, to be thrown out of operative position by any ears that catch in or clog the rolls, and means for throwing the traveling dischargers into operative position again when the obstruction has been passed or removed.

9. A rotary husking-roller, comprising a cylindrical shell provided with a plurality of peripherally-projecting husking devices held normally stationary relative to the roller, and means mounted in the roller for varying the projection of the devices from the roller.

10. A rotary husking-roller, comprising a cylindrical shell provided with a plurality of radially inwardly and outwardly adjustable husking members held normally stationary relative to the roller, and means mounted in the roller for simultaneously moving said members radially.

11. A rotary husking-roller, comprising a cylindrical shell provided with a plurality of husking-pins, means for forcing said pins inwardly, and means mounted in the roller for moving the pins outwardly.

12. A rotary husking-roller, comprising a cylindrical shell provided with a plurality of radially-slidable husking members, means mounted in the roller for sliding said members outwardly, and means for retracting said members in the opposite direction.

13. A rotary husking-roller, comprising a cylindrical shell, provided with a plurality of husking members, means mounted in the roller for simultaneously forcing said members outwardly, and means for retracting independently each of said members.

14. A rotary husking-roller, comprising a cylindrical shell provided with a plurality of radial slidable husking members projecting beyond the periphery of the roller, springs for forcing said members inwardly, and means mounted in the roller for forcing said members outwardly.

15. A rotary husking-roller comprising a cylindrical shell provided with a plurality of inwardly and outwardly movable husking members projecting beyond the periphery of the roller, and an adjusting member mounted in the roller and provided with means by which when the adjusting member is properly moved, the husking members will be moved outwardly.

16. A rotary husking-roller, comprising a cylindrical shell provided with a plurality of inwardly and outwardly movable husking members, an adjusting member mounted in the roller and provided with means for moving the husking members outwardly when the adjusting member is properly moved, and means for inwardly retracting the husking members.

17. A rotary husking-roller, comprising a cylindrical shell provided with a plurality of husking members movable inwardly and outwardly beyond the periphery of said roller, and a longitudinal movable bar mounted in said roller and provided with means for moving said husking members outwardly when the bar is properly moved.

18. A rotary husking-roller, comprising a cylindrical shell provided with a plurality of husking members movable inwardly and outwardly beyond the periphery of said roller, and a longitudinally-movable bar mounted in said roller and provided with means for simultaneously forcing said husking members outwardly when the bar is properly moved.

19. A rotary husking-roller, comprising a cylindrical shell provided with a plurality of husking members movable radially beyond the periphery of said roller, a longitudinally-movable bar mounted in said roller and provided with means for forcing said husking members outwardly when the bar is properly moved, and means for retracting inwardly said husking members when the bar is oppositely moved.

20. The combination with a hollow rotary husking-roller, of a plurality of husking members projecting beyond the periphery of the roller and movable inwardly and outwardly therein, a longitudinal movable bar mounted in said hollow roller for supporting said husking members and provided with means for moving said husking members outwardly when the bar is properly moved, and means for retaining said members in contact with said bar.

21. The combination with a hollow rotary husking-roller, of a plurality of radially-movable husking-pins mounted in said roller, a longitudinal movable bar mounted in said roller and supporting at their inner ends the said pins, the bar being provided with means for forcing the pins outwardly when the bar is properly moved, and means for forcing the pins inwardly when the bar is oppositely moved.

22. The combination with a rotary husking-roller, comprising a cylindrical shell, of a plurality of radially-adjustable husking-pins mounted in said roller, means mounted in the roller for simultaneously moving said pins radially outwardly, and means for retracting the pins inwardly.

In testimony whereof I affix my signature in presence of two witnesses.

EDWARD A. JOHNSTON.

Witnesses:
WILLIAM WEBBER,
CHAS. N. CHAMBERS.